INVENTOR
LEO V. LEGG

BY Lyle S. Mitchell

ATTORNEY

INVENTOR
LEO V. LEGG

BY Lyle S. Motley
ATTORNEY

United States Patent Office

Re. 26,483
Reissued Nov. 5, 1968

26,483

CONTROL SYSTEM FOR POWER UNITS SUCH AS ELECTRIC MOTORS AND THE LIKE

Leo V. Legg, Tulsa, Okla., assignor to Borg-Warner Corporation, Chicago, Ill., a corporation of Illinois Original No. 3,283,236, dated Nov. 1, 1966, Ser. No. 491,677, Sept. 30, 1965. Application for reissue Nov. 24, 1967, Ser. No. 689,737

2 Claims. (Cl. 318—447)

Matter enclosed in heavy brackets [ ] appears in the original patent but forms no part of this reissue specification; matter printed in italics indicates the additions made by reissue.

*ABSTRACT OF THE DISCLOSURE*

*A control system for controlling energization of a motor or the like from a multi-phase power source, including means for monitoring current in each phase to the motor, comprising a circuit responsive to signals from the sensing means in each circuit, the circuit functioning to detect unbalance in each phase by sensing the decrease in current in any one phase to thereby uncouple the motor and the source.*

The present invention relates to a control system and more particularly to such a system for protecting the operation of a power unit, such as a motor or the like, and coupled equipment.

One type of device used in the production of oil is a submersible pump having, as a part of the structure, a motor positioned in the oil well bore hole remotely from the surface. This may be an electric motor, for example, of the type using three-phase power with 1200 volts per phase and a current of 100 amperes. It is important to protect the motor and pump against operation under certain conditions such as when there is no fluid in the bore hole, a condition known as "pump-off." It is also important to disconnect the motor from the three-phase power source if there is a short or if the motor is overloaded and draws more current than permits of safe operation. In addition, it is necessary to provide a control which will disconnect the motor from the power source if the multi-phase source is unbalanced as can occur, for example, if one of the three-phase lines feeding into a transformer bank is broken or disconnected.

Accordingly, it is an object of the present invention to provide a control system responsive to high and low levels of energy flow from a power source to a power unit such as a motor and is operative to interrupt power flow if the energy level varies outside a predetermined range. The present inventive control system will find advantageous but by no means exclusive use in controlling a motor powering a submersible pump located downhole in an oil well, the energization source and control unit being located at the surface remote from the motor.

A more detailed object of the present invention is to provide a control system of the above described type which is capable of responding to energy flow conditions in each of the lines from a multi-phase source to a power unit presenting a visual indication of the conditions and terminating operation of the power unit if pre-set limit conditions are not maintained.

It is an over-all object of the present invention to provide a control system of the above type which is economical to manufacture and easy to maintain.

Other objects and advantages of the present invention will become apparent upon reading the following description and upon reference to the drawings in which.

Figure 1:
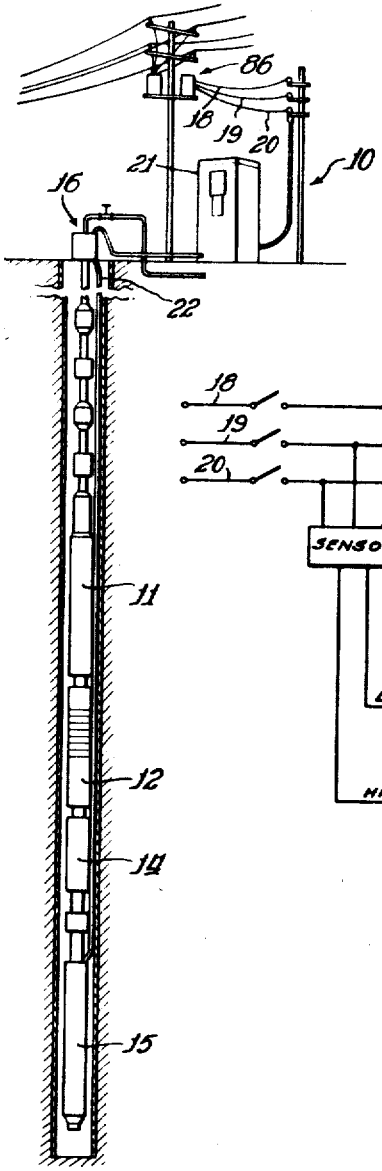
FIGURE 1 shows a schematic of the control system embodying the present invention as it would be used in an oil field installation.

Turning to the drawings, and in particular to FIGURE 1, the present invention is exemplarily embodied in an oil pumping installation 10 including a pump 11, a gas separator 12, seal section 14 and a power unit or motor 15. The pump 11 when rotated by motor 15 forces fluid through the connective tubing to a well-head 16 at the surface. From the well-head, the oil flows to collecting tank batteries or metering facilities (not shown). The gas separator 12 separates the oli from the mixture of oil and natural gas that collects in the well and the separator, also being coupled to receive power from the motor 15, drives the oil to the pump 11. The seal section 14 prevents well fluids from entering the motor while balancing internal submergence pressures. The motor 15 is energized from a three-phase source represented by a set of three lines 18, 19, 20, which enter a control panel 21 and connect with the downhole located motor by a cable 22.

Figure 2:
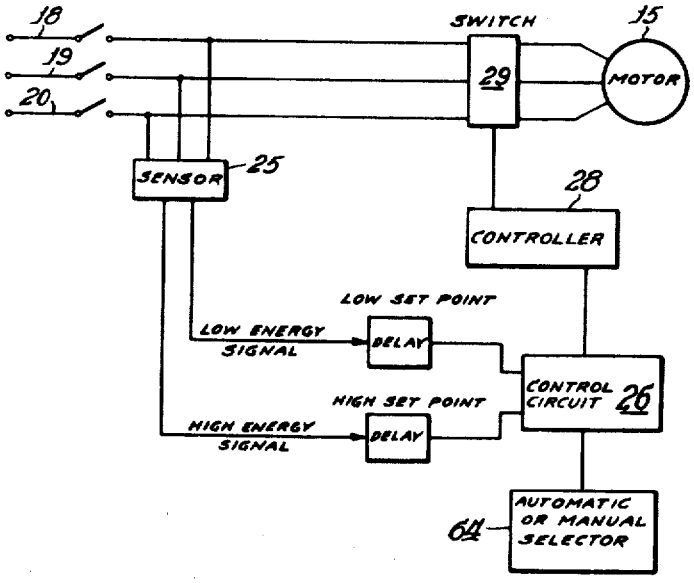
FIGURE 2 is a schematic, block diagram of the present invention.

In accordance with the present invention a control system is provided for sensing energy flow from the multi-phase source (lines 18, 19, 20) to the motor 15 and feeds a proportional signal to a control circuit coupled to operate condition control means, the control circuit being presetable so that the energy flow conditions, either above or below the respective predetermined high and low set points in any one of the lines, causes the control system to terminate operation of the power unit. In the present instance, as best shown in the block diagram of FIGURE 2, sensing is accomplished by a sensor 25 feeding a signal output to a control circuit 26 which operates a controller 28. The latter is connected to an energy flow control means 29, herein illustrated as a set of switch contacts 30a–30c and 31a–31c (see FIGURE 3), it being necessary to have two pairs of simultaneously operating contacts in each line so the high amperage can be efficiently and reliably switched.

For sensing current flow, the sensor 25, as herein illustrated (see FIGURE 3) includes a set of meters 34, 35, 36 each coupled to a respective one of the power lines. Because of the large value of the current flow in the lines, coupling is effected through two sets of step-down current transformers 38, 39, 40 and 41, 42, 43.

The meters 34, 35, 36 are of a type commercially available, one type used is identified as a General Electric Type 195 Meter Relay and Meter-Relay Pyrometer. This meter responds to a D.-C. signal, therefore, the output of each transformer is converted by respective full-wave bridge rectifiers 45, 46, 47 from an A.-C. signal proportional to current flow on a line to a proportional D.-C. signal.

For maintaining operation of the motor within preset energy flow limits, herein represented by current flow values between a high current and a low current setting, each of the meters is provided with a high set and a low set relay and associated contacts; enumerating these: meter 34 has a high set relay 51 and a low set relay 52 with respective contacts 51a, 52a; meter 35 has a high set relay 53 and a low set relay 54 with respective contacts 53a, 54a; and a meter 36 has a high set relay 55 and a low set relay 56 with respective contacts 55a, 56a. The contacts are connected into the control circuit 26 so as to effect operation of thec ontroller 28 and switch 29 to disconnect power if the current exceeds the preset high value or the preset low value.

For operating the controller 28, in the present instance comprised of a set of relays 58, 59 having associated therewith the aforementioned main line contacts 30a–30c and 31a–31c, there is provided the control circuit 26 energized in the present instance from two lines of three-phase source, lines 19, 20, through a step-down transformer 60. Describing the circuit in detail, there are the energizing lines 61, 52 across which the elements of both the control circuit and the power utilizing structure in the respective meters 34, 35, 36 are connected.

The circuit can operate either manually or automatically as will be explained subsequently by actuating a selector switch 64. The purpose of the control circuit 26 is to effect deenergization of the motor 15, and then require either manual operation to again energize the motor or to utilize a time device which is preset to initiate a restart of the motor. For initiating operation of the circuit, an overload push button 70 is operated which completes an energizing circuit for a relay coil R1 through a set of normaly-closed contacts CTR1. Energization of relay R1 closes a set of normally open contacts CR1a which serve to by-pass the push button contact 70 and hold the relay R1 energized even after the push button is released. Also closed are contacts CR1b.

Figure 3:
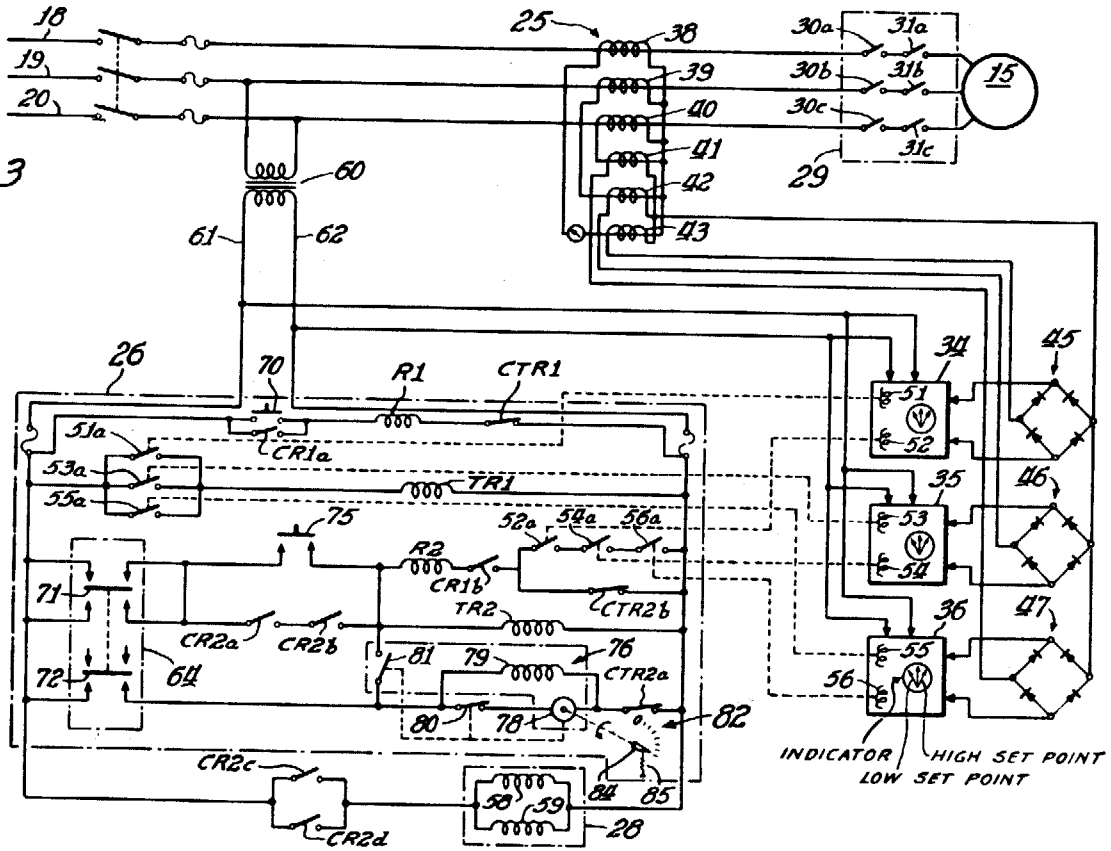
FIGURE 3 is a schematic wiring diagram of the present invention.

The exemplary selector switch 64 has a set of contacts 71, 72 operable to place the circuit in the manual or automatic mode. In FIGURE 3 when the contacts 71, 72 are moved upward, the circuit is in the manual mode prepared to respond to operation of a start button 75. Operation with the contacts moved downward, with the circuit in automatic mode, is explained subsequently. Actuation of the start button 75 closes its contacts and completes an energizing circuit for relay winding R2 through the already closed contacts CR1b and a set of normally closed contacts CTR2b. Energization of relay R2 effects energization of a set of parallel connected contacts CR2c, CR2d. Closing of these normally opened contacts completes an energizing circuit across lines 61, 62 for the controller relay windings 58, 59. The effect of the latter is to close a set of by-pass contacts CR2a and CR2b to by-pass the push button 75 and permit release thereof yet maintain the relay R2 energized, and also to close the respective line contacts 30a–30c and 31a–31c so as to complete the energizing circuit for the motor 15.

The contacts CTR2b are operated by a time delay relay TR2 which is in series with the selector switch contacts 71, actuated contacts CR2a, CR2b, all of which are connected across the energizing lines 61, 62 of the control circuit. In one installation the time delay relay TR2 is set to operate twenty seconds after the push button 75 has been actuated to start the unit. The duration of this time delay is, of course, adjustable. The purpose of the time delay is to by-pass the normally open low set-point relay contacts 52a, 54a, 56a, during the initial start up of the unit. As can be appreciated, at start the current in lines 18, 19, 20 to the motor 15 will be of a low value. Once the current has increased to above the low set-point value, which in the aforedescribed installation occurs prior to 20 seconds, opening of the by-pass contacts CTR2b makes the low set-point contacts operatively effective in deenergizing relay R2 if one of them should open. The result of deenergization of relay R2 is opening of the contacts CR2c, CR2d and deenergization of the controller relays 58, 59, which effects opening of the main line contacts 30a–30c and 31a–31c. It will be appreciated by one skilled in the art that other means than the time delay relay TR2 may be used to disable the low set-point responsive means. For example, if a start-up switch 75 is used of the push button type, as herein exemplarily shown, then the push button may be held so as to maintain its attendant contacts closed for a sufficient period of time, to assure that the energy rise or build-up is permitted without the controller 29 being deactuated or opened during start-up of the motor.

Turning now to the structure in control circuit 26 for automatic mode operation, the selector switch 64 with its contacts 71, 72 is moved to a down position, as viewed in FIGURE 3, and a circuit is completed through a time delay relay and automatic reset timer 76. The function of the latter is to initiate energization of relay R2 without requiring operation of the start button 75.

The reset timer 76 includes a motor 78 and a clutch solenoid 79 along with a set of normally closed contacts 80 and a set of normally open contacts 81. The reset timer 76 is provided with a manual adjustment 82 which permits selection of a time period after the motor 15 has been deenergized to initiate start-up. The manual time setter 82 includes manually adjustable pointer 84 which is loaded with a light spring 85 so that after the pointer 84 has been manually set the motor 78 will turn the pointer toward the zero point against the holding force of the light spring 85. This would be in a counterclockwise direction as viewed in FIGURE 3. The energizing circuit for the motor 78 is through selector switch contacts 72, normally closed contacts 80 and normally closed delay contacts CTR2a. The clutch solenoid 79 is in parallel with the series connected motor 78 and contacts 80 and prepares the reset timer 76 by actuating the contacts 80, 81 into their respective initial states.

Assuming that the selector switch has been moved to the automatic position, the solenoid 79 is energized, the contacts 80 are moved to their normally closed position and contacts 81 are placed in their normally open position. The motor 78 is energized and rotates the pointer 84 toward the zero point. The length of time which it takes the pointer to reach zero is preset manually, for example 2½ hours, at which time a mechanism (not shown) within the reset timer actuates the respective contacts 80, 81. The normally closed contacts 80 are opened and the normally open contacts 81 are closed. When contacts 81 close, an energization circuit is completed for relay R2 which, if the overload set button 70 has been operated, is placed across the lines 61, 62 and is thereby energized to actuate the respective contacts CR2c, CR2d. This, of course, effects energization of relays 58, 59 and operation of contacts CR2a and CR2b, but since the circuit associated with the selector switch contacts 71 is not utilized, their operation is redundant. The result is the same as if the start button 75 had been operated, the relay R2 effecting closing of the controller contacts 30a–30c and 31a–31c to energize the motor 15.

Opening of contacts 80 results in deenergization of the reset timer motor 78. The solenoid 79 remains energized until the time delay contacts CTR2a are operated by energization of relay TR2 with the closing of contacts 81. Thus, the reset timer is completely deenergized while the motor 15 is operating normally.

Explaining the operation of the unit, assuming first that an overload condition is sensed by any one of the meters 34, 35, 36 in one of the lines 18, 19, 20, the current valve in one or more of the lines moves above the high-set-point value. As a result, one of the respective sets of contacts 51a, 53a or 55a is operated. Closing of any one of the latter contacts results in energization of a time delay relay TR1. Energization of the latter after a preset time period, in one installation five seconds, causes the normally closed contacts CTR1 to be opened and, as a result the relay R1 is deenergized. Deenergization of the latter permits the contacts CR1b to return to their normally open position and effect deenergization of relay R2 and thereby, as has been explained, effect uncoupling of the power source from the motor 15.

As another feature of the present invention, following an overload deenergization of the motor 15, the control circuit 26 will not operate to start the motor 15 again until the overload reset button 70 is actuated. Thus, the motor 15 is protected against subjection to repeated overload surges.

The present inventive device is also responsive to an underload or low condition in any of the three lines, for example as would occur with "pump-off," a condition in which there is no fluid in the well-bore to be pumped, or, as another example, if one of the lines is broken coming into a transformer bank 86 (see FIGURE 1), thereby causing a phase unbalance with at least one of the lines carrying a low current. The response of one of the respective meters 34, 35, 36 is to operate one of the low set-point contacts 52a, 54a, 56a. These contacts are closed while the meters are receiving a signal indicating current flow is within the preset limits. However, if current flow decreases below the preset limit in one of the lines the relay associated therewith is operated and the low set-point contacts of that relay are opened. Though the low set-point contacts are opened during the start up time period, they are not effective until the parallel connected delay relay contacts CTR2b are opened, for example 20 seconds after start-up. Of course, as explained, the low set-point contacts may be disabled by holding the contacts of the start-up switch closed for an extended period of time, i.e., more than 20 seconds as an example. Subsequently, the low set point contacts must remain connected in series for the relay R2 to re-receive energization. Opening of any of the contacts 52a, 54a, 56a results in deenergization of relay R2 and the controller relays 58, 59, thereby effecting opening of the main line contacts 30a–30c and 31a–31c to stop operation of motor 15.

Summarizing, once the motor 15 has been stopped, start-up can be initiated either manually by operating start button 75, or automatically by the reset timer 76, depending upon whether the selector switch 64 is in the manual or automatic position. It is assumed of course that an overload condition has not previously stopped the motor. In the latter instance the overload reset button would have to be actuated first. With the selector switch 64 on automatic, the preset time period can be selected for the reset timer 76, in the aforementioned General Electric unit it can be any time period between ten minutes and five hours, after the lapse of which the start-up of the motor is initiated. If the condition has been corrected, the motor will run; otherwise it will again be shut down.

An additional advantage of the system is that if any of the control elements are defective or inoperative, motor 15 is disconnected from the energizing source. Accordingly, the system is fail-safe in preventing operation of the motor 15 under conditions which could damage or cause unnecessary wear to the motor or the connected equipment such as the pump 11.

From the foregoing it is clear that the control system herein described is capable of use in other installations than the exemplary oil field use for controlling motors or like power units from a multiple-channel energizing source and assuring that flow of energy to the power unit is maintained within pre-set limits, otherwise terminating operation of the power unit until the condition is corrected.

While the invention has been described in connection with a preferred embodiment, it will be understood that I do not intend to limit the invention to such an embodiment but on the contrary I intend to cover all alternatives, modifications and equivalents as may be included within the spirit and scope of the invention as defined by the appended claims.

I claim as my invention:

[1. In a control system for controlling energization of a motor or the like from a power source comprising in combination means for transmitting energy from the source to the motor, control means coupled to said energy transmitting means for selectively coupling the source to the motor, a signal producing sensor coupled to said energy transmitting means responsive to energy flow from the source to the motor, and a circuit responsive to the sensor signals for operating said control means, said circuit including a controller energizable to effect operation of said control means, means for selectively energizing said controller, first and second switches responsive to respective predetermined high and low energy level signals from said sensing means for operating said controller energizing means and effecting deenergization of said controller upon sensing of either a high or low energy signal, and means for disabling said low set-point switches for a sufficient time period to permit energy flow to the motor to rise above said low set-point value.]

[2. In a control system for controlling energization of a motor or the like from a multi-phase power source comprising in combination a main switch for coupling the source to the motor, signal producing means for sensing current flow in each phase to the motor, and a circuit responsive to signals from said sensing means for controlling operation of said main switch, said circuit means including electromechanical means and a first switch for selectively coupling said means into said control circuit, said electromechanical means responsive to energization to effect operation of said switch means to connect said source to said motor, respective second and third switch means responsive to respective predetermined high and low energy level signals from said sensing means and coupled to said electromechanical means to deenergize the latter upon sensing of such respective high and low energy signals, and a pair of time delay by-pass switches, one for each of said respective high and low set-point switching means, for initially disabling the latter and operative after respective predetermined time delays to make said energy level responsive switches effective, said high set-point by-pass delay time period being shorter than said low set-point by-pass delay time period so as to permit energy flow to said motor to rise above said low set-point at starting while assuring that an initial excess of energy flow effects deenergization of said motor.]

[3. The combination of claim 1 wherein said control circuit includes an automatic starter for initiating motor start-up and means for permitting operation of said starter only after a selectable time period has elapsed following deenergiztion of said motor in response to sensing by said circuit of energy flow conditions below or above said respective low and high set-point values.]

4. In a control system for controlling energization of a motor or the like from a multi-phase power source comprising in combination a main switch for coupling the source to the motor, signal producing means for [monitoring] *sensing* current flow in each phase to the motor, and a circuit responsive to signals from said sensing means for controlling operation of said main switch, said circuit means including a controller energizable and deenergizable for selectively operating said main switch, respective first and second switches responsive to respective predetermined high and low current signals from said signal producing [monitoring] *sensing* means and coupled to said controller to effect uncoupling of the motor and source upon sensing of such respective high and low current signals, and means for disabling said low current level responsive switch for a sufficient time period to permit current flow to the motor to rise above said low set-point value, said circuit being responsive to a phase unbalance by sensing a decrease in current in any one of the phases to thereby uncouple the motor and source.

5. In a control system for controlling energization of a motor or the like from a multi-phase power source comprising in combination a main switch for coupling the source to the motor, signal producing means for [monitoring] *sensing* current flow in each phase to the motor, means for adjusting said sensor to produce a first response to a preselected high current value and a second response to a preselected low current value, a circuit responsive to signals from said sensing means for controlling operation of said main switch, said circuit means including a controller energizable and deenergizable for selectively operating said main switch, respective first and second switches coupled to said sensor to be operated by said respective first and second responses of said sensor thereby actuating said controller to effect uncoupling of the motor and source upon sensing of respective preset high and low current values, and means for disabling said low current level responsive switch for a sufficient time period to permit current flow to the motor to rise above said low set-point value, said circuit being responsive to a phase unbalance by sensing a decrease in current in any one of the phases to thereby uncouple the motor and the source.

References Cited

The following references, cited by the Examiner, are of record in the patented file of this patent or the original patent.

UNITED STATES PATENTS

| | | | |
|---|---|---|---|
| 2,947,931 | 8/1960 | Hubby | 318—474 X |
| 3,243,658 | 3/1966 | Blackburn | 317—50 X |
| 2,697,195 | 12/1954 | Courtney | 318—452 |
| 2,818,535 | 12/1957 | Skeats | 318—452 X |
| 2,774,929 | 12/1956 | Schaefer | 318—474 |
| 3,022,641 | 2/1962 | Myck et al. | 318—452 X |
| 3,102,677 | 9/1963 | Evans et al. | 318—481 X |
| 3,142,013 | 7/1964 | McGrath et al. | 318—471 |
| 3,192,463 | 6/1965 | Kyle | 318—474 X |

ORIS L. RADER, *Primary Examiner.*

B. A. COOPER, *Assistant Examiner.*